United States Patent
Wang et al.

(10) Patent No.: US 9,342,869 B2
(45) Date of Patent: May 17, 2016

(54) DISCRIMINATIVE INDEXING FOR PATCH-BASED IMAGE ENHANCEMENT

(71) Applicant: Adobe Systems Incorporated, San Jose, CA (US)

(72) Inventors: Yan Wang, Seattle, WA (US); Jue Wang, Kenmore, WA (US); Sunghyun Cho, Daejeon (KR)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 25 days.

(21) Appl. No.: 14/265,012

(22) Filed: Apr. 29, 2014

(65) Prior Publication Data
US 2015/0310295 A1 Oct. 29, 2015

(51) Int. Cl.
*G06K 9/48* (2006.01)
*G06T 5/00* (2006.01)
*G06K 9/46* (2006.01)
*G06K 9/62* (2006.01)

(52) U.S. Cl.
CPC ............ *G06T 5/001* (2013.01); *G06K 9/4652* (2013.01); *G06K 9/6228* (2013.01); *G06K 9/6282* (2013.01); *G06K 2009/4666* (2013.01); *G06T 2207/20081* (2013.01)

(58) Field of Classification Search
USPC ......... 382/155, 159, 260, 263, 264, 274, 275; 358/1.2, 3.26, 3.27
See application file for complete search history.

(56) References Cited

U.S. PATENT DOCUMENTS

| | | | | |
|---|---|---|---|---|
| 7,545,965 | B2* | 6/2009 | Suzuki | G06T 5/007 382/128 |
| 8,204,292 | B2* | 6/2012 | Knapp | G06T 5/50 382/132 |
| 8,503,791 | B2* | 8/2013 | Conwell | G06F 17/30265 382/190 |
| 8,553,037 | B2* | 10/2013 | Smith | G06T 13/40 345/473 |
| 8,665,109 | B2* | 3/2014 | Partouche | 340/854.4 |
| 8,675,105 | B2* | 3/2014 | Lansel et al. | 348/273 |
| 8,675,999 | B1* | 3/2014 | Liang et al. | 382/299 |
| 8,687,923 | B2* | 4/2014 | Lin et al. | 382/298 |
| 8,971,612 | B2* | 3/2015 | Shotton et al. | 382/159 |

OTHER PUBLICATIONS

Yang, J., Zhang, Y., Yin, W.: An efficient TVL1 algorithm for deblurring multichannel images corrupted by impulsive noise. Journal on Scientific Computing 31(4) (2009).

Krishnan, D., Fergus, R.: Fast image deconvolution using hyperlaplacian priors. In: NIPS. (2009).

Fergus, R., Singh, B., Hertzmann, A., Roweis, S., Freeman, W.T.: Removing camera shake from a single photograph. ToG (SIGGRAPH) (2006).

(Continued)

*Primary Examiner* — Yosef Kassa
(74) *Attorney, Agent, or Firm* — Keller Jolley Preece

(57) ABSTRACT

Methods for enhancing images with increased efficiency include using a discriminative index tree to expedite image optimization processes. The discriminative index tree indexes patch-based image priors for modifying an image by using classifiers determined by exploiting a structure of the patch-based image priors. The discriminative index tree quickly and efficiently parses a space of patch-based image patches to determine approximate dominant patch-based image priors for the space of image patches. To further improve the efficiency of the discriminative index tree, one or more embodiments can limit a number of potential patch-based image priors from which a dominant patch-based image prior is selected.

20 Claims, 7 Drawing Sheets

(56) References Cited

OTHER PUBLICATIONS

Roth, S., Blacky, M.: Fields of experts. IJCV 82(2) (2009) 205-229.
Elad, M., Aharon, M.: Image denoising via sparse and redundant representations over learned dictionaries. TIP 15(12) (Dec. 2006) 3736-3745.
Zoran, D., Weiss, Y.: From learning models of natural image patches to whole image restoration. In: ICCV. (2011).
Sun, L., Cho, S., Wang, J., Hays, J.: Edge-based blur kernel estimation using patch priors. In: ICCP. (2013).
Schmidt, U., Rother, C., Nowozin, S., Jancsary, J., Roth, S.: Discriminative non-blind deblurring. In: CVPR. (2013).
Zoran, D., Weiss, Y.: Natural images, gaussian mixtures and dead leaves. In: NIPS. (2012).
Rhemann, C., Hosni, A., Bleyer, M., Rother, C., Gelautz, M.: Fast cost-volume filtering for visual correspondence and beyond. In: CVPR. (2011).
He, K., Sun, J., Tang, X.: Guided image filtering. In: ECCV. (2010).
Levin, A., Weiss, Y., Durand, F., Freeman, W.T.: Understanding and evaluating blind deconvolution algorithms. In: CVPR. (2009).
Lucy, L.B.: An iterative technique for the rectification of observed distribution. Astronomical Journal 9 (1974).
Richardson, W.: Bayesian-based iterative method of image restoration. J. Opt. Soc. Am. 62(1) (Jan. 1972).
Martin, D., Fowlkes, C., Tal, D., Malik, J.: A database of human segmented natural images and its application to evaluating segmentation algorithms and measuring ecological statistics. In: ICCV. (2001).
Cho, S., Lee, S.: Fast motion deblurring. ToG (SIGGRAPH ASIA) 28(5) (2009).

\* cited by examiner

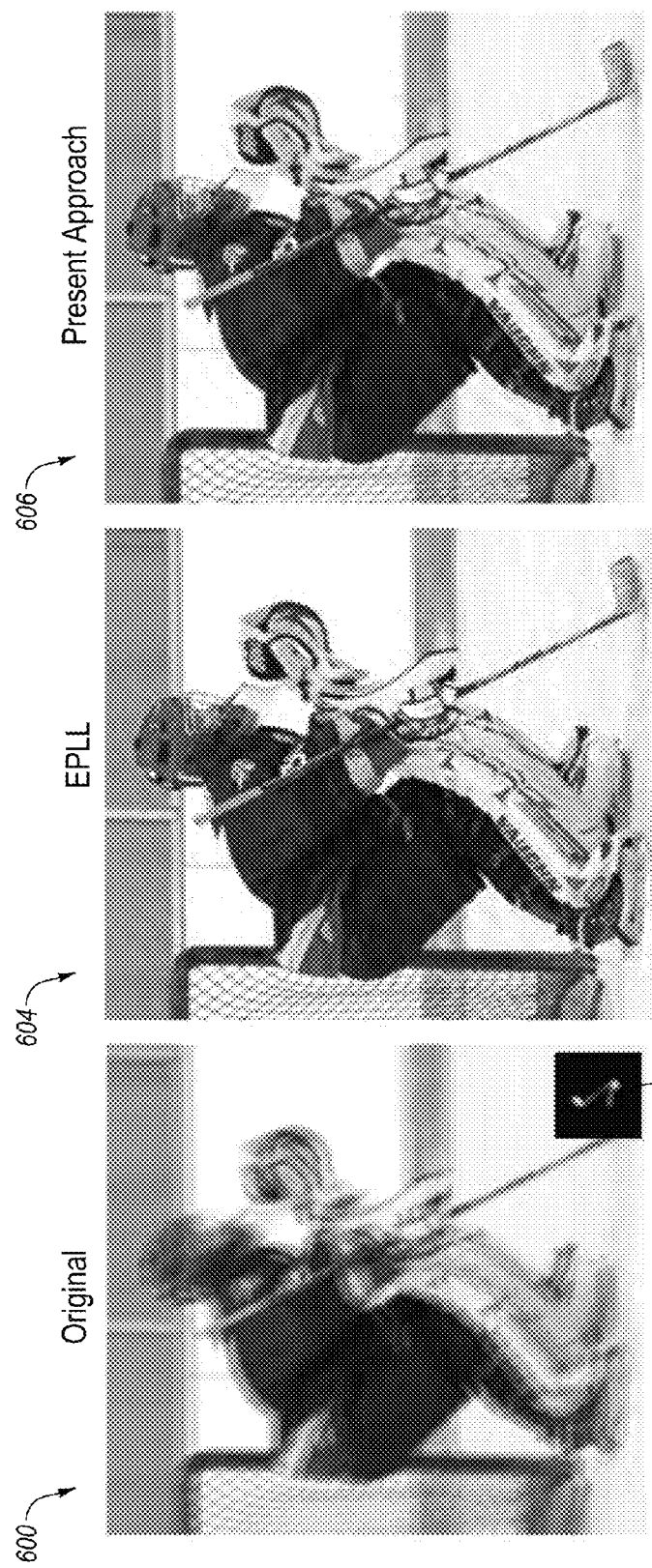

DISCRIMINATIVE INDEXING FOR PATCH-BASED IMAGE ENHANCEMENT

BACKGROUND

1. Technical Field

One or more embodiments of the present invention relate generally to systems and methods for patch-based image enhancement. More specifically, one or more embodiments of the present invention relate to systems and methods of creating and using a discriminative index tree for patch-based image enhancement.

2. Background and Relevant Art

Image enhancing techniques (e.g., deblurring, denoising, enlarging, restoring, superresolution) often involve solving a severely ill-posed problem. Conventional techniques often use image priors to aid in converging to a reasonable result. The use of image priors allows image enhancement systems to estimate visual content from available content in an image and/or other information to enhance the image. For example, an enhancement process can use information obtained from a blurry image (e.g., pixel information, color information, etc.) and statistical distribution information from image priors to deblur the blurry image.

The complexity of many types of image enhancement processes often introduces tradeoffs into the processing schemes. Some methods of image enhancement require less processing power than other methods, but may not be able to consistently and accurately provide quality results. For example, some image enhancement methods use gradient filters, which assume that the magnitude of image gradients follows certain distributions. Gradient filters can be fast, but may be unable to consistently provide high quality results.

To address the shortcomings of gradient filter approaches, some image enhancement systems use image priors with larger spatial support. For example, one such method formulates image restoration problems within a Conditional Random Field ("CRF") framework, which associates nonadjacent pixels by connecting them in the field. Conventional CRF methods can provide larger spatial support than gradient priors, but can also suffer from optimization tractability. While some CRF methods also adopt approximate inference to improve optimization, the processing speed of such CRF methods is often still slow.

A more recent trend is to define probabilistic priors on image patches (i.e., probabilistic patch-based priors). One such technique is Expected Patch Log-Likelihood ("EPLL"). Conventional EPLL-based processes train statistical data using a large number of natural or sharp image patches to compute Gaussians. Traditional EPLL-based processes takes image patches and compares them to all of the Gaussians to determine the mostly probable Gaussian to which a particular image patch corresponds. The conventional EPLL then pushes the image patch toward the Gaussian to make the image patch look like the training data (e.g., a sharp image). This process is repeated multiple times to obtain a final enhanced image.

While conventional probabilistic patch-based methods, such as the EPLL process, tend to be more accurate than gradient-based methods, probabilistic patch-based methods typically suffer from longer processing times due to the number of calculations required. For example, it is not uncommon for an EPLL-based non-blind deblurring process to take tens of minutes for a megapixel image. A blind EPLL-based deblurring process can take two to three hours due to the intensive computations. Specifically, the conventional EPLL processes typically compares over 200 Gaussians each with 64 dimensions to each patch of the image. As such, the conventional EPLL process can have millions of factors to compute as part of the enhancement process that create a bottleneck that leads to long processing times.

These and other disadvantages may exist with respect to conventional image enhancement techniques.

SUMMARY

One or more embodiments of the present invention provide benefits and/or solve one or more of the foregoing or other problems in the art with systems and methods for enhancing images with increased efficiency. For example, one or more embodiments use a discriminative index tree to expedite image enhancement processes. In particular, one or more embodiments employ a discriminative index tree that exploits a structure of patch-based image priors. The discriminative index tree is traversed for each patch to obtain a potentially applicable patch-based image prior for the patch. Thus, the discriminative index tree can provide an applicable patch-based image prior for an image patch without having to conduct an exhaustive search of patch-based image priors.

The methods and systems disclosed herein can provide improvements in image enhancement processes by increasing processing speeds without significantly compromising quality or accuracy of the image enhancements. In particular, a discriminative index tree can exploit the structure of patch-based image priors. By exploiting the structure of the patch-based image priors, the discriminative index tree can quickly index the patch-based image priors. Additionally, a discriminative index tree can allow for stable and efficient training of the discriminative index tree.

Furthermore, one or more embodiments select a limited number of patch-based image priors. Limiting the number of potential patch-based image priors to a smaller group of prominent patch-based image priors can reduce the processing time required to generate and train a discriminative index tree. The use of a limited number of prominent patch-based image priors can provide increased speeds while providing comparable results to techniques using larger groups of possible patch-based image priors.

Additional features and advantages of one or more embodiments of the present invention will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features of the invention may be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 6A illustrates a blurry image input in accordance with one or more embodiments;

FIG. 6B illustrates an image output of a conventional EPLL-based deblurring process applied to the blurry image input of FIG. 6A;

FIG. 6C illustrates an image output of a deblurring process in accordance with one or more embodiments applied to the blurry image input of FIG. 6A;

DETAILED DESCRIPTION

Figure 1:
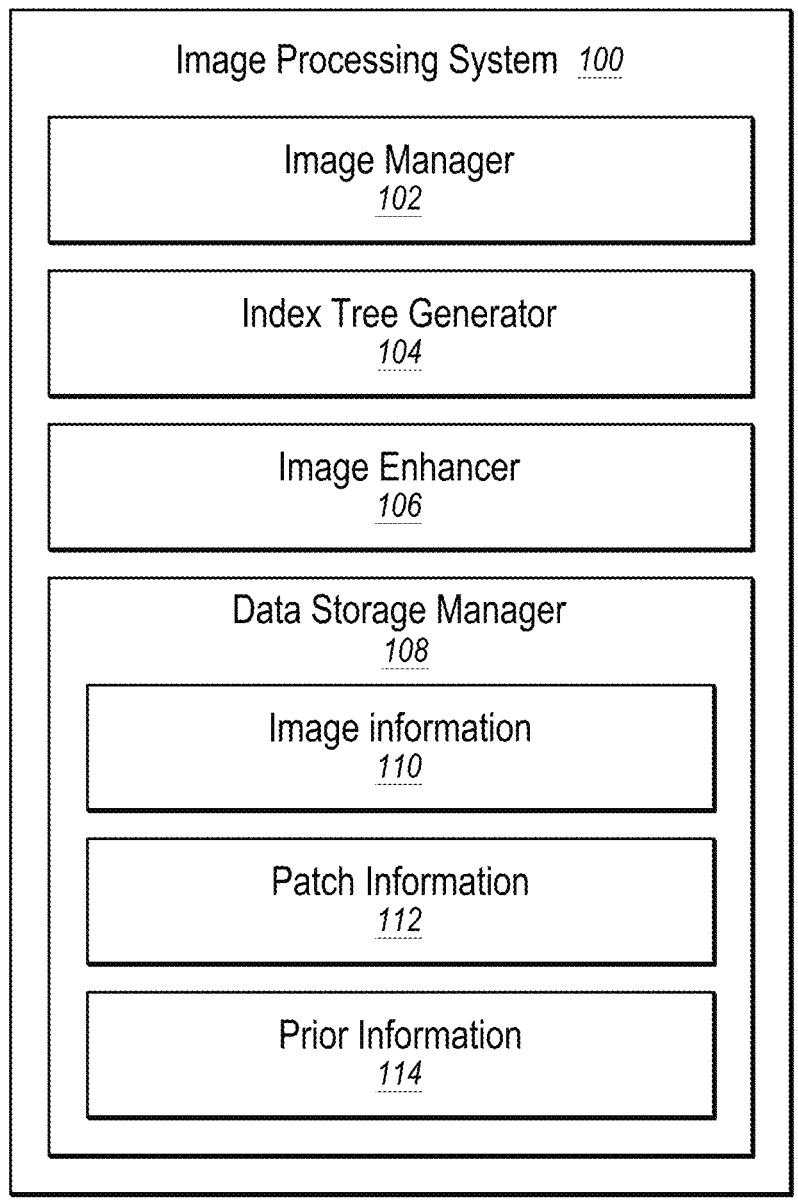
FIG. 1 illustrates a schematic overview of an image processing system in accordance with one or more embodiments.

One or more embodiments of the present invention include an image processing system that enhances images with increased efficiency. The image processing system uses probabilistic image patch priors to perform image enhancement. In particular, the image processing system can compute a rough enhancement result from an input image using a deconvolution process. The image processing system can then obtain image patches from the rough result. The image processing system can then use a discriminative index tree to determine an estimated probabilistic patch-based image prior to apply to the image patches. The image processing system can use the determined probabilistic patch-based image prior to make the image patches look more like the training data (e.g., natural image patches) used to construct the discriminative index tree. The image processing system can repeat this processes multiple times to finally obtain an enhanced image.

More specifically, the image processing system, using the discriminative index tree, can apply a series of operations to determine an approximation of a dominant patch-based image prior to which a given image patch most likely corresponds. From an information retrieval perspective, the image processing system can use the discriminative index tree to preform a series of quick tests to determine the rough area in the feature space in which a given image patch lies. The image processing system can adopt the most likely patch-based image prior in the rough area as the approximate solution. In other words, the discriminative index tree can function as a classification scheme and use discriminative classifiers to estimate the most likely or dominant patch-based image prior.

One will appreciate in light of the disclosure herein that the discriminative index tree can allow the image processing system to expedite image enhancement processes. In particular, the image processing system can traverse the discriminative index tree for each image patch to obtain an estimated dominant patch-based image prior to apply to each image patch. Thus, the discriminative index tree can replace the exhaustive search used by conventional methods to determine a dominant patch-based image prior to apply to an image patch.

Furthermore, one or more embodiments of the image processing system can provide increased processing speeds without significantly compromising quality or accuracy of the image enhancements. In particular, the discriminative index tree can exploit the structure of patch-based image priors used to construct the discriminative index tree. By exploiting the structure of the patch-based image priors, the discriminative index tree can quickly index the patch-based image priors.

In addition to the foregoing, the image processing system can select a limited number of prominent patch-based image priors. Limiting the number of potential patch-based image prior to a smaller group of prominent patch-based image priors can reduce processing times required to generate and train a discriminative index tree. The use of prominent patch-based image priors can provide increased speeds while providing comparable results to techniques that extensively search larger groups of patch-based image priors.

Thus, the image processing system can approximate a dominant patch-based image prior for a given image patch using a discriminative index tree rather than perform the complex and time consuming computations to exhaustively search all patch-based image priors derived from the natural image patches to obtain the most dominant patch-based image prior. In one or more embodiments, the image processing system can use a smoothing process to help ensure quality results despite the use of an approximated dominant patch-based image prior. In particular, the image processing system can make individual pixels conditionally dependent upon neighboring pixels to reduce steep changes between neighboring pixels. In other words, after approximating a dominant patch-based image prior for a given image patch, the image processing system can select an applicable patch-based image prior based both on the determined approximated dominant patch-based image prior for a given image patch and the patch-based image priors selected for neighboring image patches. The smoothing process can help compensate for the use of approximated dominant patch-based image priors rather than dominant patch-based image priors.

In one or more embodiments, the discriminative index tree (also referred to herein as an "index tree") determines an approximate dominant patch-based image prior for each image patch in an image for a particular iteration of the image enhancement process. As used herein, the term "patch-based image prior" refers to a parametric model or a statistical distribution that represents natural image patches. For example, a patch-based image prior may be a Gaussian distribution (also referred to herein as simply "Gaussian") determined based on a relationship of the Gaussian with training image patches from a set of natural image patches.

In some embodiments, the discriminative index tree can include a hierarchy of informed linear classifiers to separate a high-dimensional space of image patches into smaller subspaces corresponding to different patch-based image priors. For example, while traversing the tree from its root node to a leaf node, a space of patches for an image is recursively bisected by the linear classifiers until all image patches in the image are classified into a smaller subspace. The approximated dominant patch-based image prior for a particular image patch is based on the specific subspace in which the image patch is classified.

The systems and methods disclosed herein can use an efficient candidate generation scheme for generating and training the decision tree. In particular, the image processing system can select a linear classifier from a plurality of informed candidate classifiers for each non-leaf node of the decision tree based on the structure of the patch-based image priors. For example, in one or more embodiments the patch-based image priors can be based on a Gaussian Mixture Model ("GMM"). Specifically, the image processing system can calculate candidate classifiers based on characteristics of a plurality of Gaussian distributions learned from training image patches. In one example, the characteristics used to determine a particular candidate classifier can include a relationship between principal directions (e.g., eigenvalues) of a selected pair of Gaussian distributions from the GMM. The image processing system can select the linear classifier that maximizes an information gain for the non-leaf node from the calculated candidate classifiers. In alternative embodiments, the image processing system can use other types of decision trees for determining an approximate dominant patch-based image prior. Once the approximate dominant patch-based image prior is determined, the image processing system can use the approximate dominant patch-based image prior to make the image patches look more like the training data (e.g., natural image patches).

FIG. 1 illustrates a schematic overview of one embodiment of an image processing system 100. The image processing system 100 may include, but is not limited to, an image manager 102, an index tree generator 104, an image enhancer 106, and a data storage manager 108. Each of the components 102-108 of the image processing system 100 can be in communication with one another using any suitable communication technologies. It will be recognized that although the components 102-108 of the image processing system 100 are shown to be separate in FIG. 1, any of components 102-108 may be combined into fewer components, such as into a single component, or divided into more components as may serve a particular implementation.

The components 102-108 can comprise software, hardware, or both. For example, the components 102-108 can comprise one or more instructions stored on a computer-readable storage medium and executable by processors of one or more computing devices (e.g., client devices and/or server devices). When executed by the one or more processors, the computer-executable instructions of the image processing system 100 can cause the computing device(s) to perform the image enhancement methods described herein. Alternatively, the components 102-108 can comprise hardware, such as a special purpose processing device to perform a certain function or group of functions. Additionally or alternatively, the components 102-108 can comprise a combination of computer-executable instructions and hardware.

Furthermore, the components 102-108 of the image processing system 100 may, for example, be implemented as a stand-alone application, as a module of an application, as a plug-in for applications including image processing applications, as a library function or functions that may be called by other applications such as image processing applications, and/or as a cloud-computing model. Thus, the components of the image processing system 100 may be implemented as a stand-alone application, such as a desktop or mobile application. Alternatively or additionally, the components of the image processing system 100 may be implemented in any image processing application, including but not limited to ADOBE PHOTOSHOP, ADOBE PHOTOSHOP ELEMENTS, and ADOBE ILLUSTRATOR. "ADOBE", "PHOTOSHOP", "ELEMENTS", and "ILLUSTRATOR" are registered trademarks of Adobe Systems Incorporated in the United States and/or other countries.

As mentioned above, the image processing system 100 can include an image manager 102. In one or more embodiments, the image manager 102 facilitates management of images within the image processing system 100. For example, the image manager 102 can receive an image input for performing a particular enhancement operation. To illustrate, the image manager 102 can receive an image as part of an input from a user to enhance or otherwise modify the image.

Additionally, the image manager 102 can determine a number of image patches for the image. As used herein, the term "image patch" refers to a patch or group of pixels having a specific size, shape, and location corresponding to an image. For example, image patches can have a predetermined pixel width/height (e.g., 7×7, 8×8, 9×9) and a location for each image patch can be defined based on one or more center pixels.

Determining a number of image patches can include determining a number of pixels in the image. In some instances, each pixel can have a corresponding image patch with the pixel at or near the center of the image patch such that the number of image patches is equal to the number of pixels in the image. Thus, image patches corresponding to adjacent image pixels overlap each other.

The image processing system 100 can also include an index tree generator 104 to facilitate generation of the discriminative index tree. In one embodiment, the index tree generator 104 can create the decision tree by determining linear classifiers to associate with each non-leaf node of the discriminative index tree. Additionally, the index tree generator 104 can determine statistical models, such as Gaussian Mixture Models, to associate with each leaf node for use in modifying image patches of an image.

In one embodiment, the index tree generator 104 also facilitates training of the discriminative index tree. To illustrate, the index tree generator 104 can determine linear classifiers based on a plurality of patch-based image priors learned from natural image patches. In alternative embodiments, the index tree generator 104 can determine the linear classifiers using other methods.

The image processing system 100 can also include an image enhancer 106 to perform an image enhancement operation on an image. In particular, the image enhancer 106 uses patch-based image enhancement processes to modify an image in a variety of ways. Some embodiments of image enhancement can include deblurring, denoising, superresolution, enlarging, restoration, and other types of image enhancement.

In one or more embodiments, the image enhancer 106 can communicate with the image manager 102 and the index tree generator 104 to apply the decision tree produced by the index tree generator 104 to the image received by the image manager 102. For example, the image enhancer 106 uses the decision tree to determine an approximate or range of approximate dominant patch-based image priors for an image patch. The image enhancer 106 can then modify the image patch according to a selected patch-based image prior.

The image processing system 100 can also include a data storage manager 108 to facilitate storage of information for the image enhancement process. In particular, the data storage manager 108 can store information used by one or more of the components in the image processing system 100 to facilitate the performance of various operations associated with image enhancement. In one embodiment as shown in FIG. 1, the data storage manager 108 maintains image information 110, patch information 112, and prior information 114. The data storage manager 108 may also store any additional or alternative information corresponding to the operation of the image processing system 100. The data storage manager 108 can maintain additional or alternative data as may serve a particular implementation. The data storage manager 108 may communicate with any component within the image processing system 100 to obtain information for storing, managing, and enhancing images associated with the image processing system 100. In one embodiment, the data storage manager 108 includes one or more servers on which images or other information is stored. For example, the data storage manger may include a distributed storage environment.

In some instances, the image information 110 can include data corresponding to the image. In particular, the image information 110 may allow the image enhancer 106 to obtain image data necessary for performing image enhancements on the image. For example, the image information 110 may include an image, a source or a location of the image, a size of the image, a number of pixels in the image, content of each of the pixels, colors used in the image, a motion/blur kernel associated with the image and/or other information corresponding to the image.

In one or more embodiments, the patch information 112 can include data corresponding to image patches in the image. In particular, the patch information 112 can provide information for each of the image patches in the image. For example, the patch information 112 may include a location of one or more central pixels corresponding to each image patch, a size of each image patch, and/or other information corresponding to the image patches.

One or more embodiments of the data storage manager 108 may also maintain prior information 114. In particular, the data storage manager 108 may store natural image patches and patch-based image prior data derived from the natural image patches. For example, the prior information 114 can include a set of Gaussian distributions for use in modifying image patches in an image, a set of training data used in obtaining the Gaussians, or other information related to obtaining and using prior information 114 in an image enhancement process. To illustrate, the index tree generator 104 can use a set of training data (e.g., training patches selected from natural image patches) to obtain a set of possible dominant Gaussians. In some instances, relationships between the natural image patches and the Gaussian distributions can be identified based on edges or other visual artifacts identified in the training data.

Additionally, the prior information 114 can include a specific subset of patch-based image priors used based on a set of larger possible patch-based image priors. For example, a large, initial set of Gaussians can be learned from a set of training patches. While the initial set of Gaussians may provide a high accuracy, processing image enhancements over the whole set can be cost prohibitive with respect to processing time. To reduce the amount of processing time, the initial set of Gaussians can be limited to a smaller subset of Gaussians that provides comparable results to the initial set. In some examples, the subset of Gaussians can provide slightly lower accuracy than the initial set of Gaussians, but the processing time is greatly reduced. In a specific embodiment, the number of Gaussians used in an image enhancement process is ten, though the number of Gaussians can be any number according to the particular application.

Figure 2:
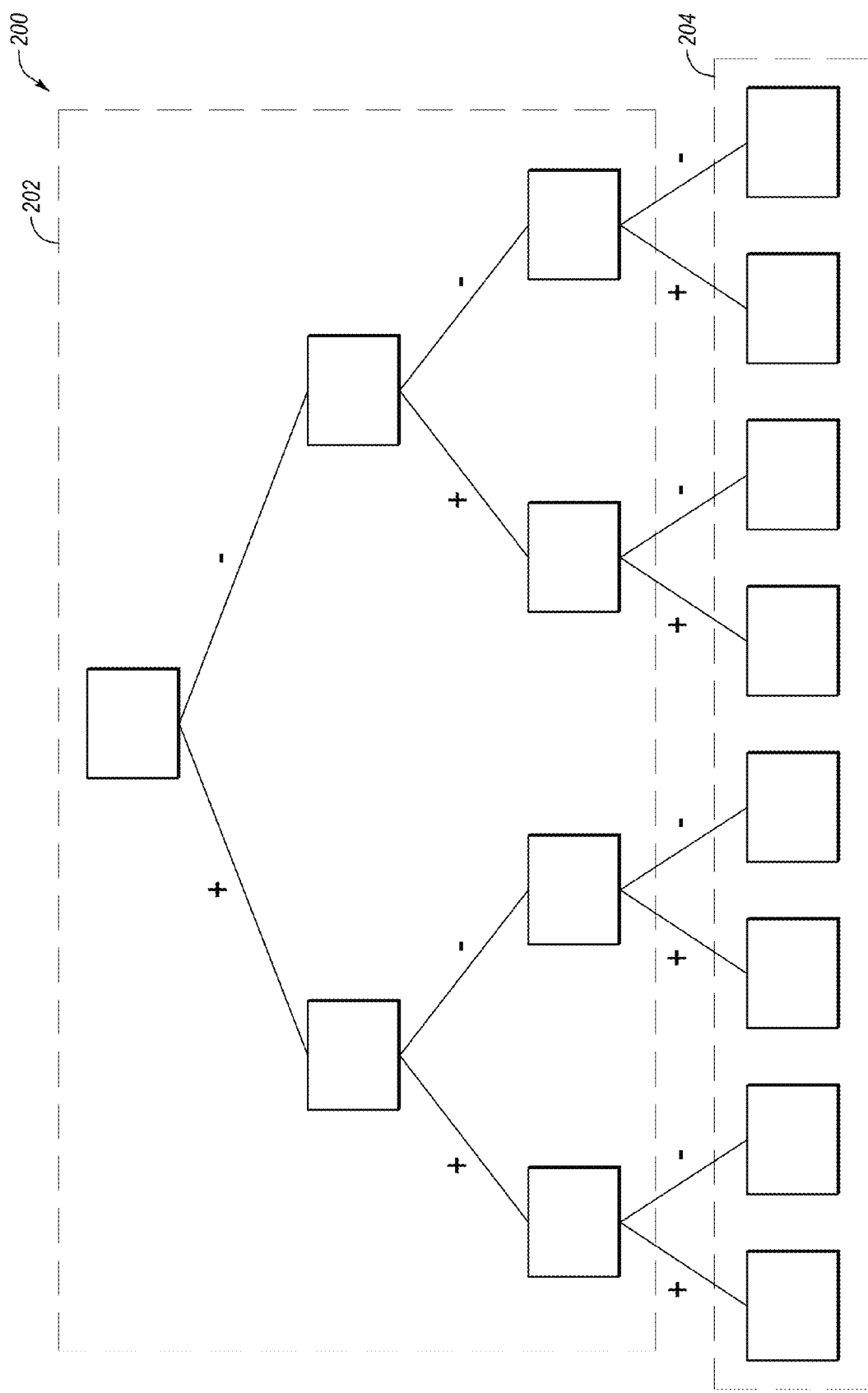
FIG. 2 illustrates a block diagram of a discriminative index tree in accordance with one or more embodiments.

As previously mentioned, the image processing system 100 can create and train a discriminative index tree for use in selecting approximate dominant patch-based image priors for the image. FIG. 2 illustrates a block diagram of a discriminative index tree 200 used by the image processing system 100. In some implementations, the discriminative index tree 200 facilitates image enhancement by allowing the image processing system 100 to determine approximate dominant patch-based image priors for an image. For example, the image processing system 100 may use the discriminative index tree 200 to determine approximate dominant Gaussians for use in modifying image patches in the image.

In one or more embodiments, the image processing system 100 may create one discriminative index tree 200 for all of the image patches in the image. In some instances, an image enhancement operation can include one or more iterations of enhancements. For operations including more than one iteration of enhancements, the image processing system 100 can use one discriminative index tree 200 for each iteration. For example, if an image operation includes six iterations to produce a good enhancement result for an image, the system 100 can create six decision trees 200—one for each iteration.

As shown, the discriminative index tree 200 is a simple representation of a discriminative index tree 200 including only four levels of nodes. In other implementations, the discriminative index tree 200 can include any number of levels as may serve a particular implementation. In one embodiment, 12 levels of nodes in the discriminative index tree 200 provides fast image enhancement without significantly compromising quality. The number of tree levels (i.e., tree depth) may determine the speed with which the discriminative index tree 200 is able to classify each image patch in an image and accuracy of the image patch classification. Consequently, the tree depth may also determine how quickly the image processing system 100 is able to perform a particular image enhancement on the image as a whole.

In one embodiment, the image processing system 100 generates the discriminative index tree 200 to include a plurality of informed classifiers to classify image patches for a particular image. In particular, the discriminative index tree 200 can include a plurality of linear classifiers in each non-leaf node 202 for classifying the image patches into the leaf nodes 204. For example, a linear classifier in a non-leaf node 202 determines whether a particular image patch is classified into a left child node or a right child node based on a result of applying the linear classifier to the particular image patch. The child nodes can then further classify the image patches into child nodes, etc., until the image patches are classified into leaf nodes 204.

In some implementations, the image processing system 100 selects the linear classifiers used to classify the image patches from a plurality of candidate classifiers. In particular, the image processing system 100 can generate a plurality of candidate classifiers for a particular non-leaf node 202 based on a plurality of Gaussians learned from training data (e.g., training image patches). The image processing system 100 can then select the linear classifier for the non-leaf node 202 by determining the linear classifier that optimizes or maximizes an information gain for the non-leaf node 202.

In one or more embodiments, the image processing system 100 associates a plurality of Gaussian labels with the leaf nodes 204 of the discriminative index tree 200. The Gaussian labels may be or may include possible dominant Gaussians for use in an image enhancement operation. In some instances, each leaf node 204 includes a separate probability distribution of Gaussian labels. In particular, a probability distribution of Gaussian labels can include a probability that each Gaussian used in the image enhancement operation is a dominant Gaussian for all image patches classified into the corresponding leaf node 204. In other embodiments, the system 100 associates a single dominant Gaussian with each leaf node 204.

As used herein, the term "dominant Gaussian" refers to a Gaussian that is learned from the natural image patches, and which most closely represents a particular image patch. The set of possible dominant Gaussians can include any number of Gaussians learned from the training patches. In one or more embodiments, the term "dominant Gaussian" refers to a Gaussian determined using the Gaussian selection equation described in greater detail below.

The term "approximate dominant Gaussian" refers to a Gaussian that is selected from a smaller subset Gaussians of the set of possible dominant Gaussians, and which most closely represents the particular image patch based on the smaller subset of possible dominant Gaussians. The smaller subset of Gaussians can include the most prominent Gaussians representing the natural image patches. Additionally, the smaller subset of Gaussians can form the Gaussian mixture model for the discriminative index tree 200. In one or more embodiments, an approximate dominant Gaussian is determined using a discriminative index tree and approximates a dominant Gaussian.

For embodiments in which the leaf nodes 204 are associated with probability distributions of Gaussian labels, additional processes can be used to determine the dominant Gaussian for each image patch. For example, the image processing system 100 can apply a smoothing or spatial consistency algorithm to a probability distribution associated with a leaf node 204 to determine an approximate dominant Gaussian for a particular image patch classified into the leaf node 204. Smoothing the probability distribution of Gaussian labels can improve the accuracy of the dominant Gaussian determined using the discriminative index tree 200. Alternatively, the system 100 can select the highest probability Gaussian associated with the leaf node 204 as the dominant Gaussian for an image patch.

According to one or more embodiments, the image processing system 100 uses an EPLL-based approach for enhancing an image. In particular, the EPLL-based approach can restore an image via a restoration/enhancement model defined as:

$$y = Ax + n,$$

where y, x, and n are vectors representing an observed blurry image—the latent image to be recovered—and noise. For denoising, A=I, an identity matrix. For deconvolution, A is a convolution matrix.

In some embodiments, the system 100 can estimate a restored image $\hat{x}$ using Maximum A Posteriori (MAP) estimation—with a Gaussian likelihood function and an assumption of Gaussian noise—defined as:

$$\hat{x} = \mathrm{argmin}_x \left\{ \frac{\lambda}{2} \|y - Ax\|^2 - \log p(x) \right\}$$

where $\lambda$ is a parameter to control the restoration strength.

In some embodiments, a GMM-based approach can be defined as:

$$p(x) = \prod_i p(x_i) = \prod_i \sum_{k=1}^{K} \pi_k \, \mathcal{N}(x_i \mid \mu_k, \Sigma_k)$$

where i is a pixel index, and $x_i$ is a patch centered at the i-th pixel. In some examples, a GMM prior $\{\mu_k, \Sigma_k, \pi_k\}_{k=1}^{K}$ can be learned from a large collection of natural image patches, with k as the index of the Gaussians, $\mu_k$, $\Sigma_k$, and $\pi_k$ as the mean, covariance and weights of the Gaussians, respectively.

Directly optimizing the MAP estimation can be difficult due to the coupling of the two terms. For efficient optimization, the system 100 can introduce auxiliary variables $\{z_i\}$ to reformulate the MAP estimation with a half-quadratic scheme defined as:

$$\hat{x} = \mathrm{argmin}_x \left\{ \frac{\lambda}{2} \|y - Ax\|^2 + \frac{\beta}{2} \sum_i \|z_i - x_i\|^2 - \sum_i \log p(z_i) \right\}$$

In one or more embodiments, the optimization can start from a small value of $\beta$ and develop by fixing x to solve for z (the z-step), and fixing z to solve for x (the x-step) alternatingly, with increasing $\beta$ values. As $\beta$ increases in size, $\hat{x}$ and $\hat{z}$ grow closer together until they are approximately the same with negligible difference. The x-step can be represented as:

$$\min \frac{\lambda}{2} \|k * x - y\|^2 + \frac{\beta}{2} \|x - z\|^2$$

While the x-step can be computed quickly—because the first and second terms of the x-step are quadratic—the z-step is a much slower optimization process. With fixed x, the z-step includes solving for all i in the non-linear optimization problem described as:

$$\hat{z}_i = \mathrm{argmin}_{z_i} \left\{ \frac{\beta}{2} \|z_i - x_i\|^2 + \log \sum_{k=1}^{K} \pi_k \mathcal{N}(z_i \mid \mu_i, \Sigma_k) \right\}$$

As shown, the z-step is a complex non-linear optimization problem that involves numerous matrix multiplications. To alleviate the optimization difficulty, a traditional EPLL approach uses only the Gaussian distribution with the largest conditional likelihood $p(k \mid P_i x)$ instead of all possible Gaussians. More specifically, with the chosen Gaussian the traditional approach solves the simplified optimization problem defined as:

$$\hat{z}_i = \mathrm{argmin}_{z_i} \left\{ \frac{\beta}{2} \|z_i - x_i\|^2 + \log \mathcal{N}(z_i \mid \mu_{\hat{k}_i}, \Sigma_{\hat{k}_i}) \right\}$$

This approximation, however, still needs a large amount of computation. The bottleneck of the traditional EPLL approach lies in using a naïve linear scan for optimizing the z-step. Specifically, to find $\hat{k}_i$ for the i-th patch, the traditional EPLL approach uses a Gaussian selection equation defined as:

$$\arg\max_k \; p(k|x_i) \propto p(x_i|k)p(k) = \sum_{z_i} p(x_i|z_i)p(z_i|k)p(k)$$

$$= \sum_{z_i} \mathcal{N}(x_i|z_i, \beta^{-1}I)\mathcal{N}(z_i|\mu_k, \Sigma_k)\pi_k$$

$$= \pi_k \mathcal{N}(x_i|\mu_k, \beta^{-1}I + \Sigma_k)$$

for all K Gaussians, resulting in a dominant Gaussian equation with 2K expensive matrix multiplication operations for every patch.

The Gaussian selection equation defined above is a discrete optimization problem for which gradient-based enhancement methods are not applicable or easily applied. Thus, the system 100 can improve upon the traditional EPLL approach by using the discriminative index tree 200 described herein to approximate $\hat{k}_i$ directly based on a series of simple operations. From an information retrieval perspective, rather than performing an exhaustive scan on all possible Gaussians, the discriminative index tree 200 allows the system 100 to use a series of quick tests to determine the rough area for the feature space in which a particular image patch lies, and to directly adopt the corresponding $\hat{k}_i$ as an approximate solution. Similarly, from a machine learning perspective, estimating $\hat{k}_i$ using the discriminative index tree 200 can be seen as treating the Gaussian selection equation as a classification problem and using discriminative classifiers to directly predict the most likely class.

Index Tree Generation and Training

While selecting the dominant Gaussian based on the output of the discriminative index tree 200 is only an approximation, using a properly constructed discriminative index tree 200 allows the system 100 to achieve high approximation accuracy in real applications. Additionally, for patches that are difficult to classify properly and for which approximating the solution is more likely to introduce errors, the value of final $\hat{k}_i$ has little effect on the quality of the restored patch $\hat{z}_i$. Thus, using a discriminative index tree 200 to index the patch-based image priors can accelerate z-step optimization with very little quality compromise.

The image processing system 100 can exploit the structure of the patch-based image priors to build an efficient index for identifying the approximate dominant Gaussians. In particular, the image processing system 100 can build the discriminative index tree 200 based on the structure of the GMM learned from the natural image patches. Most Gaussians derived from natural image patches have elongated shapes—e.g., $\Sigma_k$ has only a few large eigenvectors—and typically only partially overlap each other. Consequently, a hierarchy of simple classifiers can separate a high-dimensional space of image patches into smaller subspaces corresponding to different Gaussians. While GMM priors share the same center, the simplified optimization problem described above pushes an image patch toward the center along a path determined by the dominant Gaussian, resulting in little difference when the image patch is already close to the shared center even if an approximate dominant Gaussian is identified as the dominant Gaussian.

In one or more embodiments, a trained discriminative index tree 200 may output a dominant Gaussian k for an observed patch x to approximately maximize p(k|x). As p(k|x) also depends on $\beta$, which is the pre-defined parameter for the alternating optimization of the half-quadratic scheme above, the system 100 builds different index trees with respect to different values of $\beta$.

In some embodiments, the image processing system 100 can construct and train the discriminative index tree 200 using non-discriminative tree-training methods, particularly for low-dimension data. For example, given a set of training examples, the image processing system 100 can randomly generate classifier candidates to divide the training examples into two partitions. The image processing system 100 can select the best candidate classifier with the largest information gain computed from partitioning the space of image patches for the corresponding non-leaf node 202. In some embodiments, the candidate classifiers can be linear classifiers.

In alternative embodiments, the image processing system 100 constructs and trains the discriminative index tree 200 by exploiting the GMM structure as described herein, particularly for high-dimension data (e.g., for a large number of image patches). As illustrated in the graph diagram 300 of FIG. 3, the entropy decrease for tree-training schemes can be very different. Specifically, the graph diagram 300 presents an entropy decrease per tree level for a discriminative index tree and a non-discriminative index tree. In particular, the entropy decreases much faster for the discriminative index tree 200 constructed by exploiting the GMM structure than the non-discriminative index tree.

Figure 3:
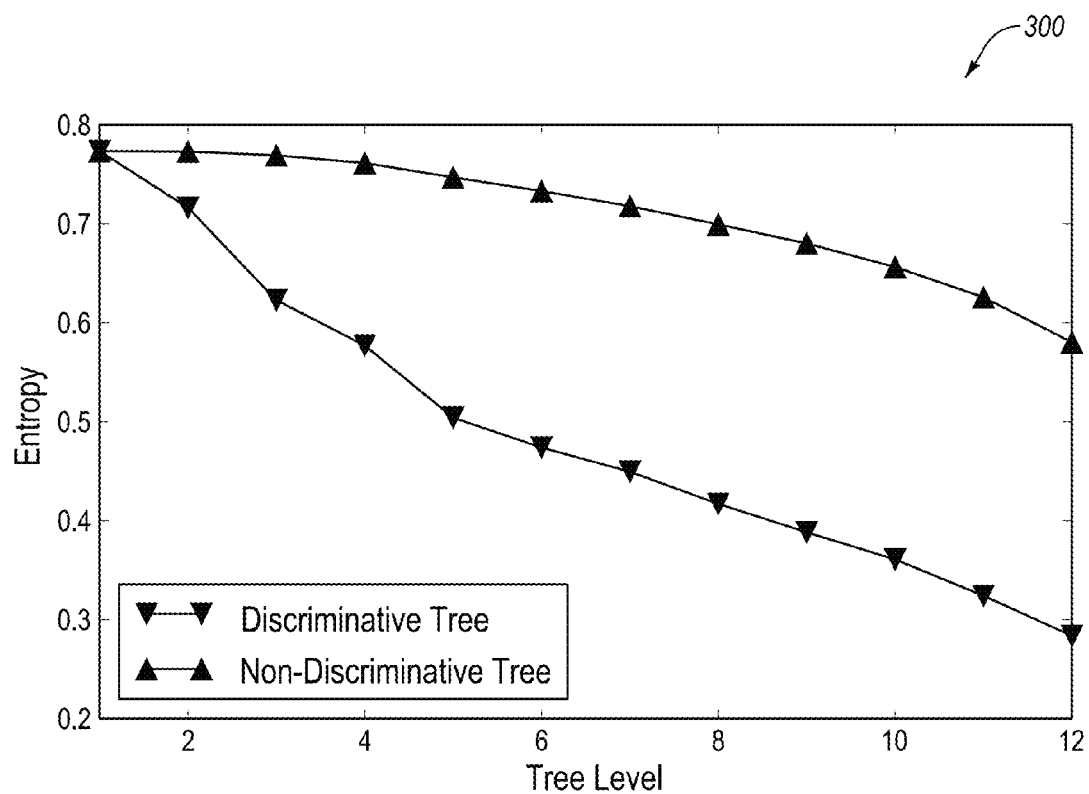
FIG. 3 illustrates a graph diagram displaying entropy decrease for different decision tree training schemes in accordance with one or more embodiments.

In the example of FIG. 3, the image processing system 100 used two million 8×8 training patches with ground truth labels determined from the Gaussian selection equation defined above. The non-discriminative tree-training algorithm is applied on the dataset with 1000 randomly generated candidate classifiers for each non-leaf node 202. Even after 12 levels, the average entropy is close to 0.6, indicating that the distributions in the leaf nodes 204 are fairly close to uniform. A greater tree depth can improve the information gain, but at the cost of slower optimization.

The discriminative index tree 200 exploiting the GMM structure accelerates tree training such that the entropy after 12 levels is greatly improved over the non-discriminative tree-training method. The discriminative index tree 200 formulates the candidate classifier generation as an optimization problem coupled with random sampling, as described in more detail below. The discriminative index tree 200 can use the recursive training framework of the non-discriminative index tree for simplicity and robustness, though other tree training frameworks may be used.

In one or more embodiments, the image processing system 100 trains the discriminative index tree 200 for a given $\beta$ using a set of noisy patches $\{x\}$ from the output of the x-steps of the EPLL enhancement method as the X for training. The image processing system 100 can then determine ground truth labels Y using the dominant Gaussian selection equation presented above. For example, given a set of noisy patches X and the ground truth labels Y, the image processing system 100 can find a linear classifier $\text{sgn}(\hat{w}^T x + \hat{b})$ so that the information gain for a particular node is maximized using an objective function defined as:

$$\hat{w}, \hat{b} = \underset{w,b}{\arg\max} \; E(Y) - \frac{|Y_+|}{|Y|}E(Y_+) - \frac{|Y_-|}{|Y|}E(Y_-)$$

in which $E(\bullet)$ is the entropy function, and $Y_+$ and $Y_-$ are the positive and negative partitions divided by the classifier equation defined as:

$$Y_+ = \{y_i | w^T x_i + b \geq 0, \forall i\|, \text{ and}$$

$$Y_- = \{y_i | w^T x_i + b < 0, \forall i\}.$$

In some embodiments, rather than using a naïve random search for high-dimensional x, the image processing system 100 can employ a Gibbs sampling approach with certain restrictions on the space from which the image processing system 100 generates candidate classifiers.

There are two observations of the learned GMM. First, for most of the Gaussians derived from the natural image patches, only a few of the strongest eigenvectors of the corresponding covariance matrix take the most energy. Thus, it is possible to drastically reduce the computational complexity by only doing sampling based on a few strong principal directions, which are the eigenvectors of the Gaussian's covariance matrices. Second, the Gaussians may all share the same center (i.e., origin), which can be explained by the inherent symmetry of the natural image patches and helps simplify the analysis.

Figure 4:
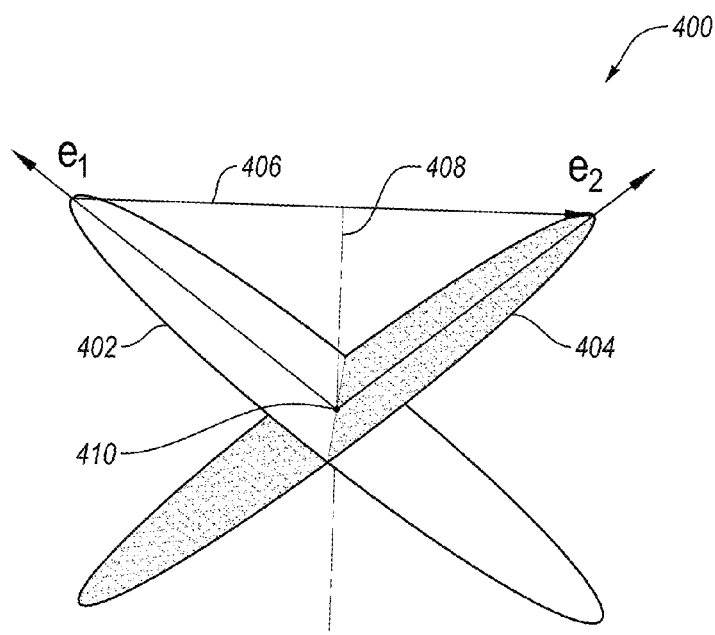
FIG. 4 illustrates a heuristic for candidate classifier generation in accordance with one or more embodiments.

These two properties inspire the use of a simple heuristic to generate a classifier candidate for two principal directions from two Gaussians, as shown by the 3-dimensional diagram 400 illustrated in FIG. 4. In some embodiments, the image processing system 100 can randomly select the Gaussians used to determine the candidate classifiers from the learned GMM priors. In particular, the image processing system 100 can select two 2-dimensional Gaussians 402-404 with the two principal directions of interest $e_1$ and $e_2$, to generate an estimate of the decision (hyper) plane can be defined as:

$$w = \lambda_1 e_1 - \lambda_2 e_2,$$

in which $\lambda_1, \lambda_2$ are the corresponding eigenvalues of $e_1, e_2$, as shown by the vector 406 connecting the peak of Gaussian 402 and the peak of Gaussian 404. Note $-e_1$ and $-e_2$ are also principal directions, such that the heuristic generates four w-s. The w determined from the two Gaussians 402-404 is represented by the dashed line 408, which is the normal 410 to the vector 406 and passes through the origin 410.

With such a candidate generation scheme, the image processing system 100 can sample the principal directions in order to partition the training data effectively. Adding a balance factor to the objective function can minimize tree depth with a target accuracy. Specifically, the positive and negative examples predicted by the classifier $sgn(\hat{w}^T x + \hat{b})$ are roughly the same in number. Additionally, relaxing the objective function to expect average projection values to be as small as possible yields a modified objective function defined as:

$$E(Y) - \frac{|Y_+|}{|Y|} E(Y_+) - \frac{|Y_-|}{|Y|} E(Y_-) - \gamma \left| \sum_x (w^t x + b) \right|$$

where $\gamma = 0.5$ is a parameter controlling the regularization strength of the balance factor.

Both terms in the modified objective function—the information gain and the balance factor—only change when some example $x_i$ changes its predicted label. In other words, the terms change faster if the image processing system 100 samples w along high-density areas with more training examples and slower along low-density areas. Thus, it is reasonable to sample more w-s from the regions with low GMM probabilistic densities, which are analogous to stationary points in the continuous case. More specifically, the image processing system 100 assigns higher priority to sampling decision boundaries between two principal directions with large eigenvalues. Given the weights of the Gaussians $\{\pi_k\}$, the image processing system 100 first samples two Gaussians with probability $p(k) = \pi_k$, then samples one principal direction from the eigenvectors of the covariance matrix of each Gaussian $\{e_{ki}\}$ with corresponding eigenvalues as the probability $p(i|k) = \lambda_{ki}$. The image processing system 100 then applies the decision plane estimate to the principal directions to obtain the final w-s, forming a Gibbs sampling process. Because all of the Gaussians share the same center as the origin, the image processing system 100 can use the normal distribution $\mathcal{N}(0, 1)$ to sample the b-s for the modified objective function.

An algorithm for determining the patch-based image priors according to one or more embodiments can include receiving a patch-based image prior $\{\pi_k, \mu_k, \Sigma_k\}_{k=1}^K$, training examples X, the ground truth labels Y, the max tree depth D, and a number of iterations $I_{max}$. The algorithm outputs a discriminative index tree T based on linear classifiers. If D=0, the algorithm returns a leaf node with a label distribution of Y.

For each iteration from $1 \leq I \leq I_{max}$, the algorithm includes sampling two Gaussians $k_1, k_2$ without replacement with probability $p(k) = \pi_k$. Given each Gaussian k from $k_1, k_2$, the algorithm samples one eigenvector from the eigenvectors of the covariance matrix $\{e_{ki}\}$ with probability $p(i|k) = \lambda_{ki}$, where $\lambda_{ki}$ are the corresponding eigenvalues. The algorithm includes using the decision plane estimate to generate w-s given the two eigenvectors $e_1, e_2$. The algorithm also includes sampling b from $\mathcal{N}(0, 1)$ for each iteration.

After sampling the candidate w and b for the specified number of iterations, the algorithm includes collecting all the candidate w and b and storing the values maximizing the modified objective function in the tree node T. In one embodiment, the number of iterations is preset to allow the image processing system 100 to generate a specific number of candidate classifiers for each node. In one example, the number of candidate classifiers generated for a particular node is approximately 300.

The algorithm also includes training the left and right child of T with (D−1) tree depth and $Y_+, Y_-$ as training data for the particular node, which are defined in the classifier equation. After training the tree, the algorithm returns the trained decision tree T. The image processing system 100 can repeat this process for each node in the tree for as many levels of tree nodes as may serve a particular embodiment until all non-leaf nodes 202 in the tree are trained.

Tree Traversal

As described above, when classifying the image patches into leaf nodes 204, the image processing system 100 can apply the discriminative index tree 200 to each image patch individually to determine approximate dominant Gaussian distributions for the image patches. For example, for a particular image patch, the discriminative index tree 200 begins at a root node and classifies the image patch to a child node based on the linear classifier associated with the root node. To illustrate, the root node includes a linear classifier defined as:

$$\text{Next}(x_i | w, b) = \begin{cases} \text{Left child} & w^T x_i + b \geq 0 \\ \text{Right child} & w^T x_i + b < 0 \end{cases}$$

While traversing the discriminative index tree 200 from its root node to a leaf node 204, a space of patches can be recursively bisected by the linear classifiers. Bisecting the space of patches results in a polyhedron $L_i = \{x | W_i x + B_i \leq 0\}$, with $W_i$ and $B_i$ determined by the traversal path of $x_i$. In one embodiment, the image processing system 100 stores an expected probability of each Gaussian distribution dominating a random point within the polyhedron $\phi_{ik} = E_{x \in L_i} [\text{Prob}(\mathcal{N}(x) = \mathcal{N}_k)]$ in the leaf node 204, and uses the expected probability to approximate the probability of $x_i$ having $\mathcal{N}_k$ as the dominant Gaussian distribution.

Each linear classifier only requires a dot product operation, resulting in efficient tree testing. Additionally, only a few levels of tree nodes may be needed for reasonable accuracy in practice. In one embodiment, the discriminative index tree 200 can have a depth of 12, though the tree can have any depth as may serve a particular implementation.

In some embodiments, rather than selecting the dominant Gaussian $\hat{k}_i$ for a given image patch based solely on the classification of the given image patch, the image processing system 100 employs a smoothing process to select the dominant Gaussian $\hat{k}_i$ from a plurality of possible distributions associated with a given leaf node 204. In particular, the image processing system 100 can use a Markov Random Field (MRF) to infer the final dominant Gaussians with the enforcement on spatial consistency in terms of the dominant Gaussians. Specifically, the potential function of the MRF is defined as:

$$\psi(\{\hat{k}_i\}) = \lambda_1 \sum_i \psi_1(\hat{k}_i) + \lambda_2 \sum_{\text{Neighbors } i,j} \psi_2(\hat{k}_i, \hat{k}_j)$$

where $\psi_1(\hat{k}_i) = -\phi_{i\hat{k}_i}$, and $\psi_2(k_i, k_j)$ are defined as:

$$\psi_2(\hat{k}_i, \hat{k}_j) = \begin{cases} 0 & \text{if } \hat{k}_i = \hat{k}_j \\ |I_i - I_j|^2 & \text{otherwise} \end{cases}.$$

$I_i$ and $I_j$ are the average intensities of the image patches $x_i$ and $x_j$, respectively. The potential function described above can be minimized to find the redefined dominant Gaussian $\{\hat{k}_i\}$ for all image patches in the image by adopting an approximation approach using cost volume filtering. In some embodiments, the cost-volume filters can update the marginal distribution stored in each node. In particular, such updates can be performed with a guided filter, which is accelerated by integral images. More specifically, K "images" with intensities as $\phi_{ik}$ are first collected, and the guided filter is applied on every "image", with the smoothed input from the x-step, mentioned previously, as guidance. In alternative embodiments, the image processing system 100 may use other methods of smoothing the probability distribution of Gaussian labels or selecting from a plurality of Gaussians associated with the leaf nodes 204.

After finding the approximate dominant Gaussian $\hat{k}_i$ for an image patch $x_i$, the image processing system 100 uses the approximate dominant Gaussian $\hat{k}_i$ in the simplified optimization problem described above to optimize the z-step via a Wiener filter, defined as:

$$\hat{z}_i = (\Sigma_{\hat{k}_i} + \sigma^2 I)(\Sigma_{\hat{k}_i} x_i + \sigma^2 I \mu_{\hat{k}_i}).$$

In one or more embodiments, using the discriminative index tree 200 based on the GMM structure improves a time complexity of the image enhancement process. In particular, given a discriminative index tree 200 with depth D for a K-component GMM defined on n×n patches, the tree traversal for an image patch requires $O(n^2 D)$ operations. The cost-volume filtering requires $O(K)$ time for each image patch. Thus, the overall time complexity is $O(mn^2 D + mK)$ for an image with m patches, with a very small coefficient for $O(K)$ from the guided filter. In contrast, a traditional EPLL approach requires $O(mn^4 K)$ time. Thus, the use of a discriminative index tree can accelerate the traditional EPLL approach by 40 times in some embodiments. Furthermore, the use of the discriminative index tree can provide increased processing times with very little quality compromise.

In one embodiment, the image processing system 100 uses patch-based image enhancement processes to deblur an image. A series of experiments quantitatively verifies (1) the discriminative prior indexing efficiency in performing dominant Gaussian identification; and (2) real-world performance of the discriminative prior indexing in terms of both quality and speed for real-world applications. In particular, the experiments evaluate the performance of the discriminative index tree 200 in the image deconvolution task on a standard benchmark, and then perform a qualitative evaluation on real-life photos to demonstrate the potential of the discriminative index tree 200 in practical applications.

Evaluation on Non-Blind Deconvolution

The experimental data uses eight blur kernels to convolve a standard set of eight 512×512 gray-scale test images, and adds 1% Gaussian noise to obtain an input of blurred images to the image processing system 100. The experiment can use different deblurring approaches (the Lucy-Richardson algorithm, the hyper Laplacian prior, the traditional EPLL approach, and the image enhancement approach described herein) to the input images, and reports average Peak signal-to-noise ratio (PSNR) and structural similarity (SSIM) among all the test images as quantitative measurements.

Specifically, the experiment collects two million patches from 100 training images, convolves them with one of blur kernel different from all the testing kernels, and adds Gaussian noise to obtain the training data. The experiment trains an index tree with 12 levels for each β in the half-quadratic equation described above. Additionally, the GMM used includes only 10 separate patch-based image priors from the GMM for the traditional EPLL approach and the present approach described herein.

The present approach is implemented in MATLAB, with core components such as the discriminative index tree 200 written in C++. The experimental data also uses MATLAB to implement the traditional EPLL approach to take advantage of MATLAB's optimized matrix library. All running times associated with the experimental data are measured on a desktop computer with a Core i7 3.0 GHz processor.

The table below presents the average PSNR and SSIM of the experimental data according to the various approaches.

| Baselines | PSNR (dB) | SSIM | Time (s) |
| --- | --- | --- | --- |
| L-R | 25.85 | 0.916 | 0.61 |
| Hyper Laplacian | 27.97 | 0.920 | 0.45 |
| Traditional EPLL | 31.07 | 0.933 | 123 |
| Present Approach | 30.80 | 0.928 | 3.0 (25) |

The experimental data presents two running times for the present approach. The running time displayed in parentheses for the present approach corresponds to a measurement with an un-optimized implementation, for which the running time of the z-step is reduced from 83 seconds to 2.5 seconds on average. Additionally, the image processing system 100 can use a Fast Fourier Transform approach to accelerate the x-step, resulting in a comprehensive, fast non-blind deblurring algorithm. The optimized implementation improves the speed of patch-based prior deblurring (EPLL) by more than 40 times while maintaining similar quality, even when the blur kernel for generating the discriminative index tree 200 is dramatically different from the blur kernels used in the test images. This suggests that the discriminative index tree 200 may not be sensitive to the blur kernel used for training.

Evaluation on Prior Indexing and Parameter Tuning

Using the same training data and training algorithm for the non-blind deconvolution experiments above, further experiments vary the depth of the decision trees 200 to explore the performance on indexing. The experimental data calculates the classification accuracy of the dominant Gaussian with ground truth from a brute-force search among every GMM prior and averages the accuracy on all stages and test images as the evaluation protocol.

Figure 5A:
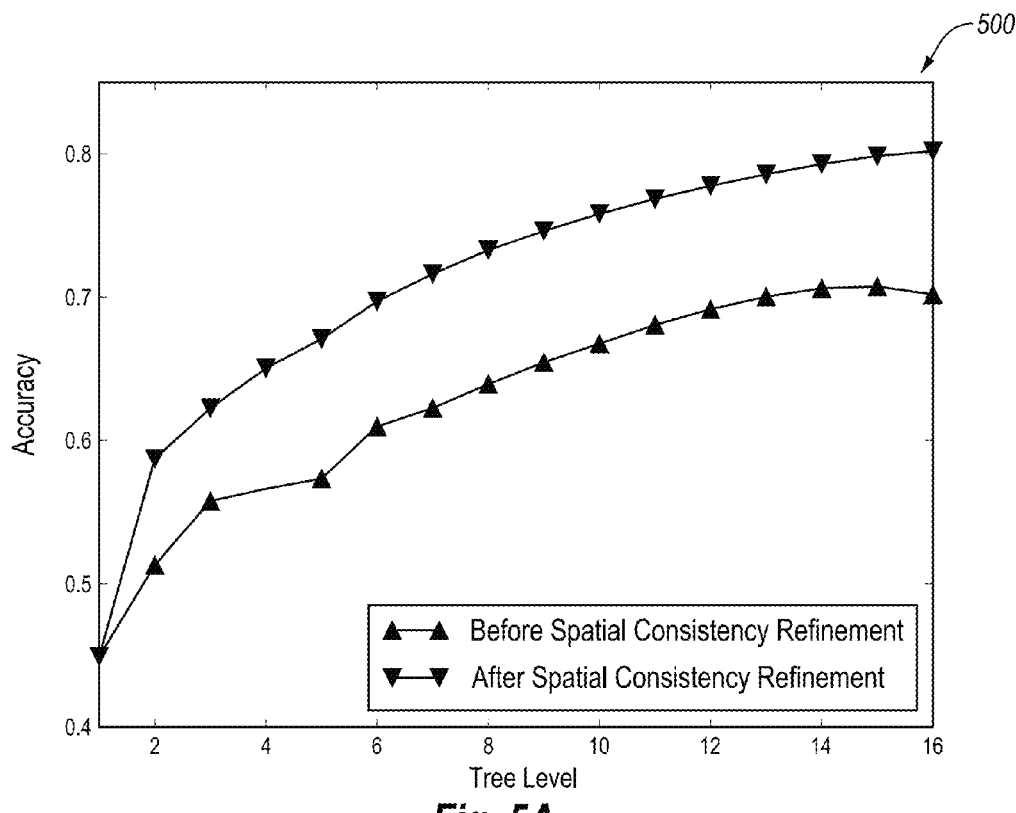
FIGS. 5A-5B illustrate graph diagrams displaying image component identification accuracy in accordance with one or more embodiments of the present invention.
Figure 5B:
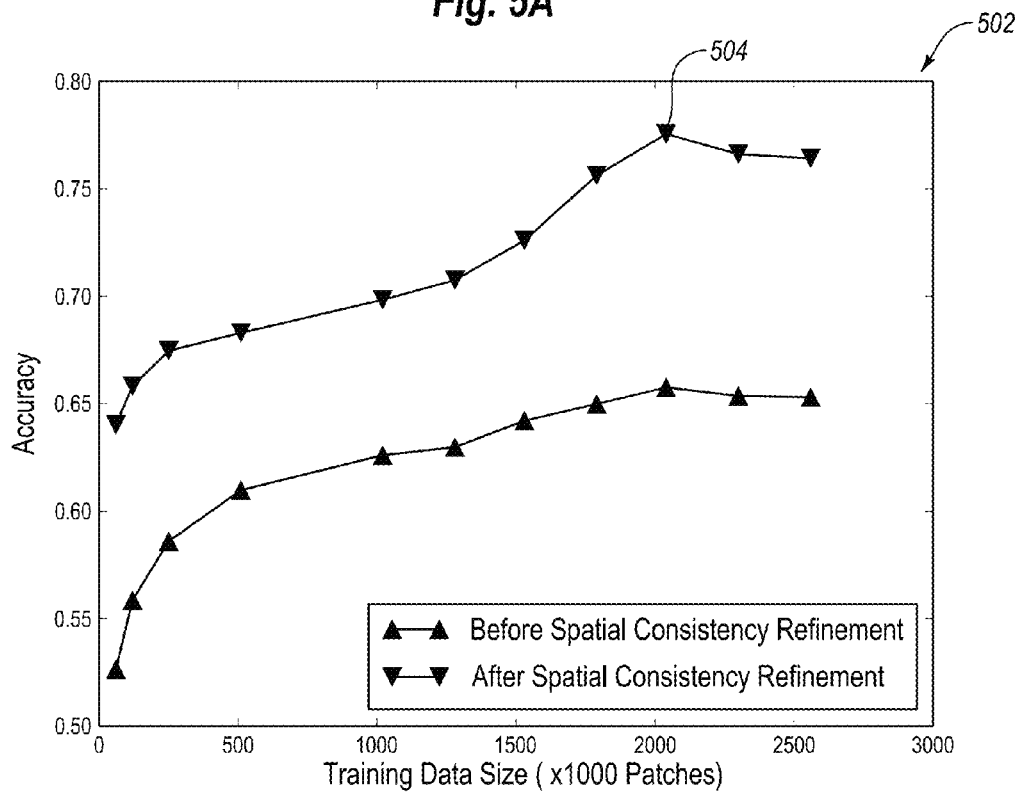

FIGS. 5A-5B illustrate graph diagrams 500-502 displaying image component identification accuracy before and after spatial consistency refinement. FIG. 5A illustrates the identification accuracy for different tree depths. As shown, the identification accuracy reaches approximately 80% with 16 levels of tree nodes. Given that the GMM includes 10 different patch-based image priors, the identification accuracy shows that the discriminative index tree 200 does a reasonable job in approximating the brute-force search with only a few dot product operations. All other experiments described herein use 12 levels of tree nodes based on the trade-off between quality and efficiency. Additionally, the experimental data suggests that the cost-volume based MRF inference improves the identification accuracy by 10% consistently over the raw identification results, as illustrated in FIG. 5A. Using the same training data, FIG. 5B illustrates the identification accuracy for different training data sizes for a 12-level discriminative index tree 200. As shown, the identification accuracy reaches a saturation point 504 after the training dataset reaches approximately two million patches.

FIG. 6A illustrates an image input for use in various deblurring processes. In particular, the image input is a blurry image 600 from which the image processing system 100 estimates a blur kernel 602 for applying to the different deblurring processes. The experimental data used a plurality of color image inputs with a resolution of approximately 800×800 for testing with the various deblurring processes, though only a single image input is shown. The deblurring processes were applied on each of the R, G, B color channels of the different image inputs separately.

FIGS. 6B-6C illustrate image outputs of the different deblurring methods for the image input of FIG. 6A. In particular, the traditional EPLL approach and the present approach were applied to the input image to deblur the image. The output 604 of the traditional EPLL approach is presented in FIG. 6B, and the output 606 of the present approach is illustrated in FIG. 6C.

While the image input had a resolution of approximately 800×800 or larger, the traditional EPLL approach required more than 30 minutes to deblur the image. Such a result is not practical for deblurring applications in real life scenarios, especially for use in commercial applications by typical consumers. In contrast, the present approach took approximately 3 minutes to deblur the image. Thus, while the traditional EPLL approach may produce an image with slightly sharper results, the present approach still achieves nearly the same results as the traditional approach in much less time.

In particular, the image processing system 100 uses patch-based image enhancement processes to modify an image in a variety of ways. Some embodiments of image enhancement can include deblurring, denoising, superresolution, enlarging, restoration, and other methods of image enhancement, which estimate image data using statistical representations of portions of an image.

FIGS. 1-6, the corresponding text, and the examples, provide a number of different systems and devices for enhancing images with increased efficiency. In addition to the foregoing, embodiments of the present invention also can be described in terms of flowcharts comprising acts and steps in a method for accomplishing a particular result. For example, FIGS. 7 and 8 illustrate flowcharts of exemplary methods in accordance with one or more embodiments of the present invention.

Figure 7:
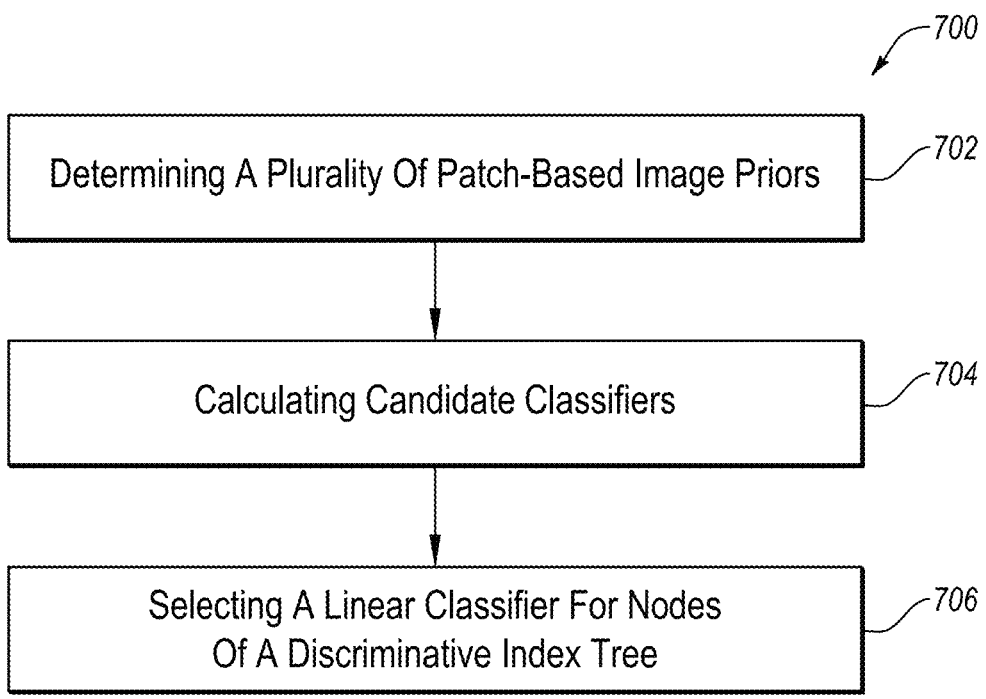
FIG. 7 illustrates a flowchart of a series of acts in a method of discriminative index tree generation for patch-based image enhancement in accordance with one or more embodiments.
Figure 8:
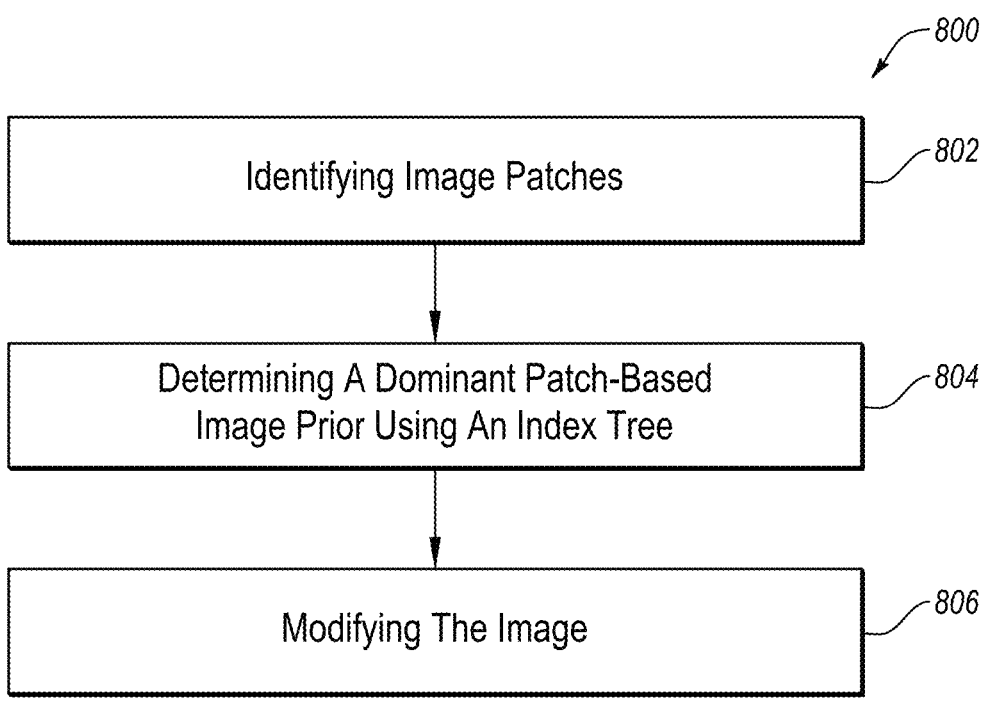
FIG. 8 illustrates a flowchart of a series of acts in a method of patch-based image enhancement using a discriminative index tree in accordance with one or more embodiments.

FIG. 7 illustrates a flowchart of a series of acts in a method 700 of index generation for patch-based image enhancement in accordance with one or more embodiments of the present invention. The method 700 includes an act 702 of determining a plurality of patch-based image priors. More specifically, act 702 involves determining a plurality of patch-based image priors from a plurality of natural image training patches. For example, act 702 can involve learning a Gaussian mixture model over pixels of the natural image training patches to generate a plurality of Gaussians.

The method 700 also includes an act 704 of calculating candidate classifiers. In particular, act 704 involves calculating, by at least one processor, a plurality of informed candidate linear classifiers based on a structure of the plurality of patch-based image priors. As part of act 704, or as an additional act, the method 700 can include identifying a subset of prominent Gaussians from the plurality of Gaussians. Act 704 can also involve generating informed candidate linear classifiers based on relationships between eigenvectors associated with randomly sampled pairs of Gaussians of the subset of prominent Gaussians. For example, act 704 can involve sampling one principal direction from the eigenvectors of a covariance matrix of each Gaussian of a randomly sampled pair of Gaussians.

As part of act 704, or as an additional act, the method 700 can include determining a vector 406 extending from a peak of a first principal direction $e_1$ of a first Gaussian 402 of a randomly sampled pair of Gaussians to a peak in a first principal direction $e_2$ of a second Gaussian 404 of the randomly sampled pair of Gaussians. The method can also include calculating an informed candidate linear classifier from a normal 408 of the vector 406 through a shared center 410 of the first Gaussian 402 and the second Gaussian 404.

FIG. 7 further illustrates that the method 700 includes an act 706 of selecting a linear classifier for nodes of a discriminative index tree 200. More specifically, act 706 involves selecting a linear classifier from the plurality of informed candidate linear classifiers for each non-leaf node 202 of a discriminative index tree 200. Act 706 can further involve determining an informed candidate linear classifier that maximizes an information gain. The information gain can be based on ground truth labels identifying dominant Gaussians. The dominant Gaussians can be determined using a Maximum A Posteriori estimation with a Gaussian likelihood function and the assumption of Gaussian noise. For example, act 706 can involve determining which informed candidate linear classifier maximizes an objective function comprising the information gain and a balance factor.

Referring now to FIG. 8, a flowchart of a series of acts in a method 800 of patch-based image enhancement is illustrated. As shown, the method 800 includes an act 802 of identifying image patches. In particular, act 802 involves identifying a plurality of image patches associated with an image to be enhanced. For example, act 802 can involve identifying image patches from an initial deconvolution of the image based on an identified blur kernel for the image. In an alternative example, act 802 can involve identifying image patches from a previous image enhancement iteration.

The method 800 also includes an act 804 of determining a dominant patch-based image prior using an index tree 200. More specifically, act 804 involves determining, by at least one processor, an approximate dominant patch-based image prior for a particular image patch associated with the image using an index tree 200 indexing a plurality of potential dominant patch-based image priors. For example, act 804 can include recursively bisecting image patches using the linear classifiers to classify the image patches into a polyhedron with characteristics determined by the traversal path of each image patch.

Act 804 can also involve traversing a plurality of non-leaf nodes 202 each including a linear classifier to arrive at a leaf node 204. For example, act 804 can involve traversing to a child node of a particular non-leaf node 202 based on a sign value determined for the linear classifier using the particular image patch. Additionally, act 804 can involve determining an expected probability that one or more patch-based image priors is a dominant patch-based image prior for the particular image patch based on a path taken traversing the plurality of non-leaf nodes 202.

As part of act 804, or as an additional act, the method 800 can involve determining an approximate dominant patch-based image prior for each image patch associated with the image using the index tree 200. The method 800 can also apply a smoothing function to select the approximate dominant patch-based image prior for the particular image patch based on the expected probability and approximate dominant patch-based image priors for neighboring patches. For example, the smoothing function can include a Markov Random Field.

Method 800 additionally includes an act 806 of modifying the image. In particular, act 806 involves modifying the image by adjusting the particular image patch using the determined dominant approximate dominant patch-based image prior. For example, act 806 can involve applying a Wiener filter to the particular image patch using the determined approximate dominant patch-based image prior. Act 806 can further involve modifying the image in a plurality of iterations. Act 806 can also involve using a new index tree indexing a plurality of potential dominant patch-based image priors for each of the plurality of iterations to determine an approximate dominant patch-based image prior for the particular image patch.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

One or more embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
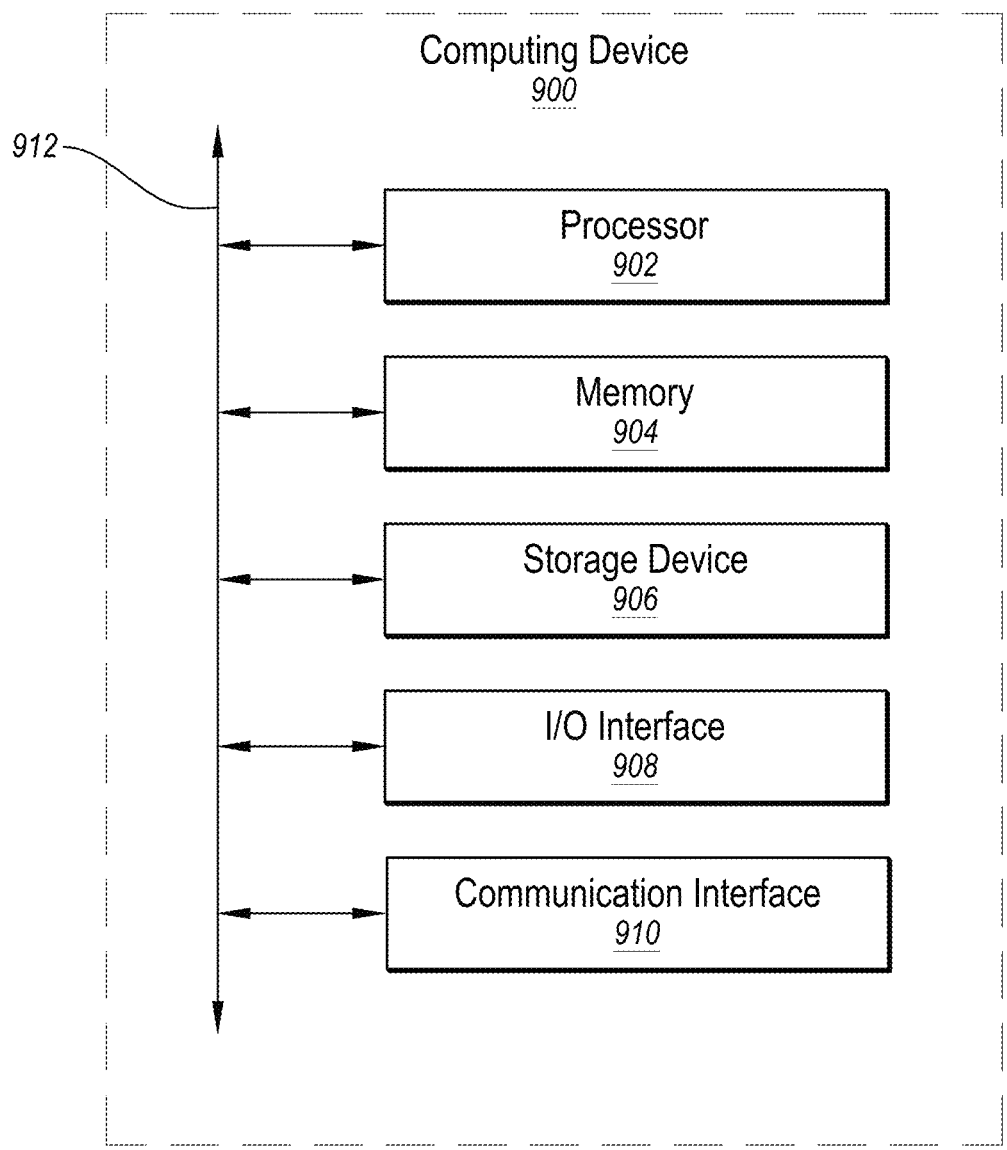
FIG. 9 illustrates a block diagram of an exemplary computing device in accordance with one or more embodiments.

FIG. 9 illustrates a block diagram of an exemplary computing device that may be configured to perform one or more of the processes described above. One will appreciate that the image processing system can comprise implementations of the computing device 900. As shown by FIG. 9, the computing device can comprise a processor 902, memory 904, a storage device 906, an I/O interface 908, and a communication interface 910. While an exemplary computing device 900 is shown in FIG. 9, the components illustrated in FIG. 9 are not intended to be limiting. Additional or alternative components may be used in other embodiments. Furthermore, in certain embodiments, a computing device 900 can include fewer components than those shown in FIG. 9. Components of computing device 900 shown in FIG. 9 will now be described in additional detail.

In particular embodiments, processor(s) 902 includes hardware for executing instructions, such as those making up a computer program. As an example and not by way of limitation, to execute instructions, processor(s) 902 may retrieve (or fetch) the instructions from an internal register, an internal cache, memory 904, or a storage device 906 and decode and execute them. In particular embodiments, processor(s) 902 may include one or more internal caches for data, instructions, or addresses. As an example and not by way of limitation, processor(s) 902 may include one or more instruction caches, one or more data caches, and one or more translation lookaside buffers (TLBs). Instructions in the instruction caches may be copies of instructions in memory 904 or storage 906.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 includes a storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to the computing device 900. In particular embodiments, storage device 906 is non-volatile, solid-state memory. In particular embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a stylus or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 910. As an example and not by way of limitation, computing device 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 900 may include any suitable communication interface 910 for any of these networks, where appropriate.

The computing device 900 can further include a bus 912. The bus 912 can comprise hardware, software, or both that couples components of computing device 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method of generating an index tree for identifying patch-based image priors for patch-based image enhancement, comprising:
    determining a plurality of patch-based image priors from a plurality of natural image training patches;
    calculating, by at least one processor, a plurality of informed candidate linear classifiers based on a structure of the plurality of patch-based image priors;
    selecting a linear classifier from the plurality of informed candidate linear classifiers for each non-leaf node of a discriminative index tree; and
    generating, by the at least one processor, an enhanced output digital image by applying the discriminative index tree to an input digital image.

2. The method as recited in claim 1, wherein determining the plurality of patch-based image priors from the plurality of natural image training patches comprises learning a Gaussian mixture model over pixels of the natural image training patches to generate a plurality of Gaussians.

3. The method as recited in claim 2, further comprising identifying a subset of prominent Gaussians from the plurality of Gaussians.

4. The method as recited in claim 3, wherein calculating the plurality of informed candidate linear classifiers based on the structure of the plurality of patch-based image priors comprises generating informed candidate linear classifiers based on relationships between eigenvectors associated with randomly sampled pairs of Gaussians of the subset of prominent Gaussians.

5. The method as recited in claim 4, wherein selecting a linear classifier from the plurality of informed candidate linear classifiers for each non-leaf node of the discriminative index tree comprises determining an informed candidate linear classifier that maximizes an information gain.

6. The method as recited in claim 5, wherein the information gain is based on ground truth labels identifying dominant Gaussians, the dominant Gaussians being determined using a Maximum A Posteriori estimation with a Gaussian likelihood function and the assumption of Gaussian noise.

7. The method as recited in claim 5, wherein determining the informed candidate linear classifier that maximizes the information gain further comprises determining which informed candidate linear classifier maximizes an objective function comprising the information gain and a balance factor.

8. The method as recited in claim 4, wherein generating informed candidate linear classifiers based on relationships between eigenvectors associated with randomly sampled pairs of Gaussians of the subset of prominent Gaussians comprises sampling one principal direction from the eigenvectors of a covariance matrix of each Gaussian of a randomly sampled pair of Gaussians.

9. The method as recited in claim 8, further comprising:
    determining a vector extending from a peak of a first principal direction of a first Gaussian of a randomly sampled pair of Gaussians to a peak in a first principal direction of a second Gaussian of the randomly sampled pair of Gaussians; and
    calculating a first informed candidate linear classifier from a normal of the vector through a shared center of the first Gaussian and the second Gaussian.

10. The method as recited in claim 9, further comprising:
    determining a second informed candidate linear classifier based on a vector extending from the peak of the first principal direction of the first Gaussian to a peak in a second principal direction of the second Gaussian;
    determining a third informed candidate linear classifier based on a vector extending from a peak of a second principal direction of the first Gaussian to the peak in the first principal direction of the second Gaussian; and
    determining a fourth informed candidate linear classifier based on a vector extending from the peak of the second principal direction of the first Gaussian to the peak in the second principal direction of the second Gaussian.

11. A method of patch-based image enhancement, comprising:
    identifying a plurality of image patches associated with an input digital image to be enhanced;
    determining, by at least one processor, an approximate dominant patch-based image prior for an image patch from a plurality of image patches associated with the input digital image using an index tree indexing a plurality of potential dominant patch-based image priors;
    modifying, by the at least one processor, the input digital image by adjusting the image patch from the plurality of image patches using the determined approximate dominant patch-based image prior; and
    generating, by the at least one processor, an enhanced output digital image comprising the adjusted image patch.

12. The method as recited in claim 11, wherein determining an approximate dominant patch-based image prior for the particular image patch using the index tree comprises:
    traversing, for the image patch from the plurality of image patches, a plurality of non-leaf nodes each including a linear classifier to arrive at a leaf node;

based on a path taken traversing the plurality of non-leaf nodes, determining an expected probability that one or more patch-based image priors is a dominant patch-based image prior for the image patch from the plurality of image patches.

13. The method as recited in claim 12, further comprising:
determining an approximate dominant patch-based image prior for each image patch associated with the input digital image using the index tree;
applying a smoothing function to select the approximate dominant patch-based image prior for the image patch from the plurality of image patches based on the expected probability and approximate dominant patch-based image priors for neighboring patches.

14. The method as recited in claim 13, wherein generating the enhanced output digital image comprises deblurring the input digital image by modifying one or more image patches from the plurality of image patches associated with the input digital image.

15. The method as recited in claim 12, wherein traversing, for the image patch, the plurality of non-leaf nodes comprises:
determining a sign value for the linear classifier at a particular non-leaf node using the image patch from the plurality of image patches; and
traversing to a child node of the particular non-leaf node based on the determined sign value for the linear classifier.

16. The method as recited in claim 11, wherein modifying the input digital image using the determined approximate dominant patch-based image prior comprises applying a Wiener filter based on the determined approximate dominant patch-based image prior to the image patch from the plurality of image patches.

17. The method as recited in claim 11, further comprising:
modifying the image in a plurality of iterations; and
using a new index tree indexing a plurality of potential dominant patch-based image priors for each of the plurality of iterations to determine an approximate dominant patch-based image prior for the image patch from the plurality of image patches.

18. A system for patch-based image enhancement, comprising:
at least one processor;
at least one non-transitory computer readable storage medium storing instructions thereon, that, when executed by the at least one processor, cause the system to:
identify a plurality of image patches associated with an input digital image to be enhanced;
determine an approximate dominant patch-based image prior for an image patch from a plurality of image patches associated with the input digital image using an index tree indexing a plurality of potential dominant patch-based image priors;
modify the input digital image by adjusting the image patch from the plurality of image patches using the determined approximate dominant patch-based image prior; and
generate an enhanced output digital image comprising the adjusted image patch.

19. The system as recited in claim 18, wherein determining an approximate dominant patch-based image prior for the image patch from the plurality of image patches using the index tree comprises:
traversing, for the particular image patch, a plurality of non-leaf nodes each including a linear classifier to arrive at a leaf node;
based on a path taken traversing the plurality of non-leaf nodes, determining an expected probability that one or more patch-based image priors is a dominant patch-based image prior for the image patch from the plurality of image patches.

20. The system as recited in claim 19, further comprising instructions that when that when executed by the at least one processor, cause the system to:
determine an approximate dominant patch-based image prior for each image patch associated with the input digital image using the index tree;
apply a smoothing function to select the approximate dominant patch-based image prior for the image patch from the plurality of image patches based on the expected probability and approximate dominant patch-based image priors for neighboring patches.

* * * * *